United States Patent
Chaudhri et al.

(10) Patent No.: US 8,204,015 B2
(45) Date of Patent: Jun. 19, 2012

(54) METHOD AND APPARATUS FOR ZONE CONTROLLER BASED DYNAMIC SPECTRUM ALLOCATION

(75) Inventors: Apoorv Chaudhri, Cambridge, MA (US); Yadunandana N. Rao, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 533 days.

(21) Appl. No.: 12/474,886

(22) Filed: May 29, 2009

(65) Prior Publication Data

US 2010/0303026 A1 Dec. 2, 2010

(51) Int. Cl.
  H04W 4/00 (2009.01)
  H04J 1/00 (2006.01)
  H04L 12/413 (2006.01)
(52) U.S. Cl. .......... 370/329; 370/343; 370/445
(58) Field of Classification Search ............ None
  See application file for complete search history.

(56) References Cited

U.S. PATENT DOCUMENTS

| | | | |
|---|---|---|---|
| 6,950,624 B2 * | 9/2005 | Kim et al. | 455/3.01 |
| 7,965,641 B2 * | 6/2011 | Ben Letaief et al. | 370/237 |
| 2006/0286934 A1 | 12/2006 | Kuffner et al. | |
| 2008/0165754 A1 * | 7/2008 | Hu | 370/342 |
| 2008/0225789 A1 * | 9/2008 | Kim et al. | 370/329 |
| 2008/0261639 A1 | 10/2008 | Sun et al. | |
| 2009/0135744 A1 * | 5/2009 | Chaudhri et al. | 370/278 |

OTHER PUBLICATIONS

International Search Report and Written Opinion for International Application No. PCT/US2010/033950 mailed on Sep. 14, 2010.
International Preliminary Report on Patentability for International Application No. PCT/US2010/033950 mailed on Nov. 29, 2011.

* cited by examiner

Primary Examiner — Nittaya Juntima
(74) Attorney, Agent, or Firm — Barbara R. Doutre

(57) ABSTRACT

The application discloses a method and apparatus for dynamic spectrum allocation to a secondary communication system seeking to operate within the spectrum of a regulated primary communication system. The method includes clustering a plurality of secondary devices based on an operating frequency utilized by each of the secondary devices. The method then includes assigning sensing opportunities to the plurality of clustered secondary devices. The method then includes, receiving sensing information from each of the clustered secondary devices. The sensing information indicates at least one of an occupied channel frequency and an unoccupied channel frequency in the spectrum. The method further includes determining at least one spectrum opportunity, in the spectrum, that is unoccupied by each of a plurality of primary devices based on the received sensing information, and allocating the at least one spectrum opportunity to at least one of the secondary devices.

23 Claims, 4 Drawing Sheets

US 8,204,015 B2

METHOD AND APPARATUS FOR ZONE CONTROLLER BASED DYNAMIC SPECTRUM ALLOCATION

FIELD OF THE DISCLOSURE

The present disclosure relates generally to a wireless communication system and more particularly to a method and apparatus for dynamic spectrum allocation in the wireless communication system.

BACKGROUND

Wireless products and services have continued to expand to the point that finite resources of available communication spectrum are being overwhelmed. Industry has been forced to make dramatic changes, as it must adapt to accommodate the exponential demand on spectrum access, efficiency and reliability.

The Federal Communications Commission (FCC) in the United States, and its counterparts around the world, allocate radio spectrum across frequency channels of varying bandwidth. Various frequency bands may cover, for example, broadcast radio, television, cellular phones, citizen's-band radio, pagers and so on. As more devices go wireless, an increasingly crowded radio spectrum needs to be shared.

Further, the FCC and its counterparts allocate the frequency channels only to the incumbent devices that have license to the radio spectrum. However, there is a small portion of the radio spectrum left for allocation to an increasing number of emerging wireless devices. Although the radio spectrum is almost entirely allocated to the licensed/incumbent devices, not all the licensed devices use the allocated frequency channels. At least at some geographical locations or at some time period, a large portion of allocated spectrum may be sitting idle, even though it is officially accounted for.

Cognitive radio is a paradigm for wireless communication in which either a network or a wireless device uses spectrum that are licensed to other users or systems on a temporary secondary basis. This type of secondary access of unlicensed spectrum by a secondary system or cognitive device has to ensure minimum interference to the licensed users.

Accordingly, there exists a need for method and apparatus for dynamic spectrum allocation in a wireless communication system.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method, steps and apparatus components related to dynamic spectrum allocation. The present disclosure is directed towards a method for dynamic spectrum allocation to a secondary communication system that is seeking to operate within the spectrum of a regulated primary communication system. The method includes clustering a plurality of secondary devices based on an operating frequency utilized by each of the secondary devices. The method then includes assigning sensing opportunities and receiving sensing information from each of the clustered secondary devices. Further, the method includes combining of sensing information at various levels to identify at least one unoccupied channel frequency in the spectrum. The method then includes determining at least one spectrum opportunity, that is unoccupied by each of a plurality of primary devices based on the received sensing information, and allocating the at least one spectrum opportunity to at least one of the secondary devices. The spectrum opportunity may refer to a channel of a particular band or a particular bandwidth of a frequency. The method also includes allocating the spectrum opportunities to various secondary devices based on a frequency reuse scheme so that the secondary devices do not interfere with each other or with the primary devices operating in the region on other frequencies.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
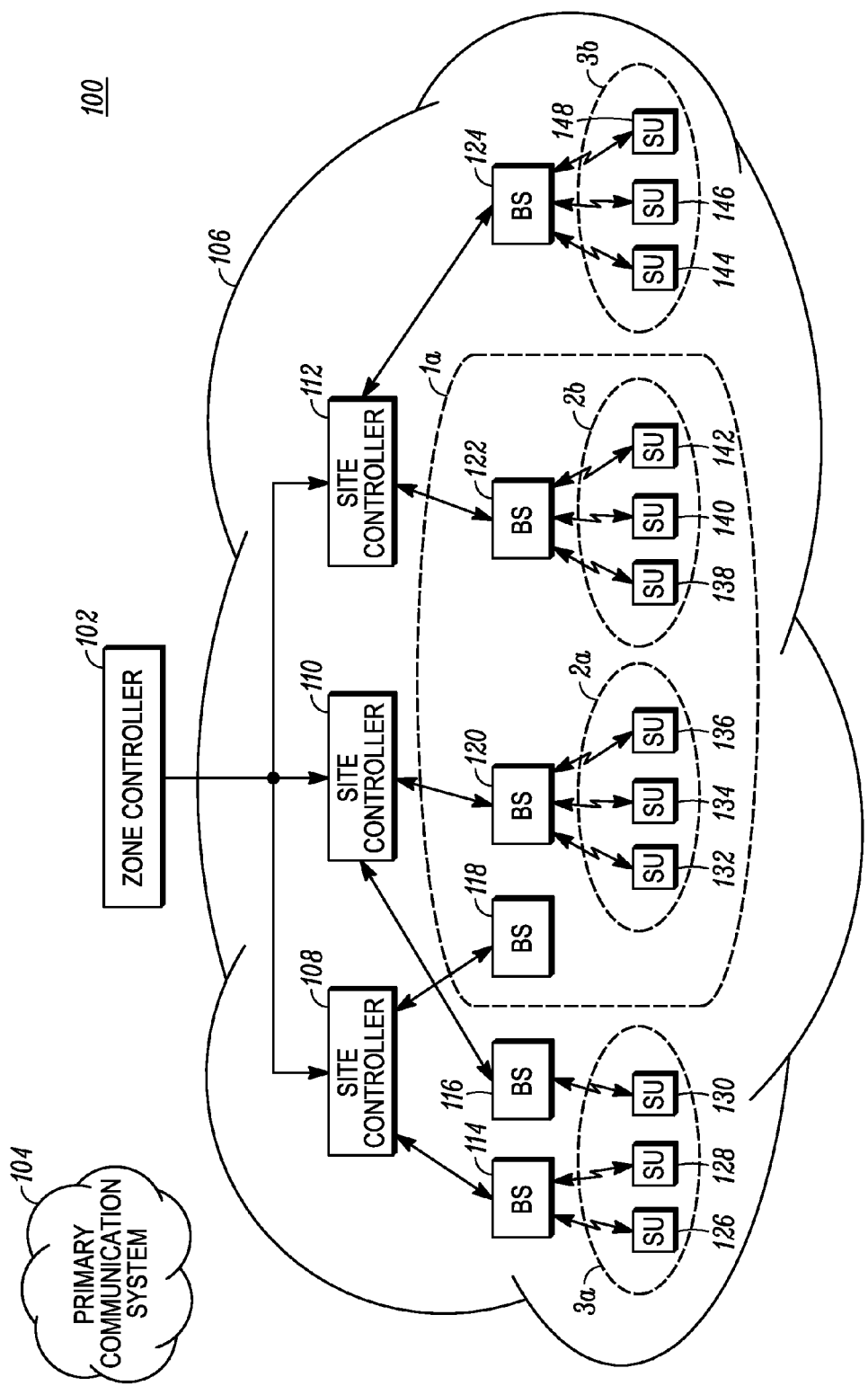
FIG. 1 is a schematic of a geographical region in accordance with some embodiments.

FIG. 1 illustrates a schematic of a geographical region 100 in accordance with some embodiments. The geographical region 100 includes a zone controller 102, a primary communication system 104, and a secondary communication system 106. The zone controller 102 is communicatively coupled to a plurality of site controllers 108, 110, 112 via wired links. Similarly, the site controllers 108-112 are communicatively coupled to a plurality of secondary base-stations (BS) 114, 116, 118, 120, 122, and 124 via wired links. The secondary base stations 114-124 are coupled to a plurality of secondary subscriber units (SU) 126, 128, 130, 132, 134, 136, 138, 140, 142, 144, 146, and 148 via wireless links. The plurality of secondary base stations 114-124 and the plurality of secondary subscriber units 126-148 can also be referred to as a plurality of secondary devices 114-148.

In accordance with the embodiment, the primary communication system 104 includes a plurality of primary devices (not shown) that are associated with the corresponding licensed users. The primary devices are also known as incumbent devices. Incumbents are often licensed users/devices, such as television (TV) broadcasters in a TV spectrum or Land Mobile Radios in Public Safety or LMR spectrum. The primary system in TV spectrum may include a television receiver that is within a service contour, licensed wireless microphones, or other systems governed by the FCC or other regulatory body. The primary communication system 104 may be operating for example, in TV spectrum licensed to TV broadcasters and Wireless Microphone. The primary communication system 104 includes a plurality of primary devices, for example, primary subscriber units and primary base stations.

In accordance with the embodiment, the secondary devices 114-148 in the secondary communication system 106 are those devices that are associated with the unlicensed users. The secondary devices 114-148 are preferably subscriber units and base stations of a public safety system seeking to share spectrum without interfering with any of the incumbent/primary devices in the primary communication system 104. The secondary communication system 106 may include variety of communication networks, for example a public safety network, cellular network or other system having at least one master node, for example a base station, and slave node, typically in the form of a subscriber unit, such as a portable radio, cell-phone, PDA, cognitive radio or the like. Secondary communication system 106 may also include ad hoc networks, where multiple units communicate among each other, and may dynamically designate master and slave nodes. There is an increased interest in deploying public safety devices in secondary spectrum to improve interoperability, range and data throughput and maintain mission criticality in case of emergencies and disaster management scenarios.

In accordance with the embodiment, the secondary devices 114-148 in the secondary communication system 106 are clustered into a plurality of groups at various levels based on one or more criteria, such as, location of the corresponding secondary devices 114-148, frequency operated by the corresponding secondary devices 114-148. For example, groups 2a, 2b, 3a, 3b are formed at a lower level based on either location or the operating frequency of the secondary subscriber units 126-148. Similarly, group 1a is formed at a higher level and includes the secondary base stations 118, 120, 122 that are operating at a single frequency. As known to those skilled in art, the base stations 114, 116, 124 can also be grouped into similar groups (not shown) and the secondary devices 114-148 may be grouped into further similar groups at various higher and lower levels. The groups at each level are directed by devices at higher levels to sense particular frequencies at a particular time for a particular duration of time and send back sensing information to the higher level.

In accordance with the embodiment, the sensing information includes in-band sensing information and out-of-band sensing information. The in-band sensing information includes the sensing information of the operating frequency currently utilized by a corresponding secondary device 114-148. For example, if the secondary device 132 is currently operating on the frequency f1, the in-band sensing information will include sensing information about the frequency f1 i.e., whether or not an incumbent/primary device is using the frequency f1. Further, in order to perform such in-band sensing, the secondary device 132 requires a quiet period. A quiet period is defined as a period of time where the corresponding secondary device 114-148 stops transmitting on the particular channel frequency for a predetermined time interval. For example, if a secondary subscriber unit 132 has to determine in-band sensing information for the frequency f1, currently utilized by the secondary subscriber unit 132, the secondary subscriber unit 132 has to stop transmitting on the frequency f1 for a particular time interval while the in-band sensing information is determined.

On the other hand, the out-of-band sensing information includes the sensing information of at least one channel frequency other than the operating frequency currently utilized by the corresponding secondary device 114-148. For example, if the secondary device 132 is currently utilizing an operating frequency f1, the out-of-band sensing information will include sensing information of at least one frequency in the spectrum, other than the frequency f1, for example, f2, f3 and so on. More particularly, the out-of-band sensing information will indicate whether or not an incumbent/primary device is using any of the frequencies f2, f3, and so on. The zone controller 102 maintains a list of all the frequencies that are detected as being unoccupied by any of the primary devices. In one embodiment, the in-band sensing and out-of-band sensing information is passed from the groups at the lower level to the groups at the next higher level and further to the site controllers 108-112 and then to zone controller 102.

In accordance with the embodiment, the secondary subscriber units 126-148 are clustered into various groups, by the secondary base stations 114-124, based on one or more criteria. For example, the secondary subscriber units 132, 134, 136 can be grouped or clustered together under one group 2a based on their location. Similarly, the secondary devices 138, 140, 142 are grouped under another group 2b based on their location.

The secondary subscriber units 126-148 are clustered at the lower level into various groups based on one or more criteria for out of band sensing. The secondary subscribers units 126-148 are clustered so that while one group is sensing potentially unoccupied frequencies in a predefined sensing opportunity, the base stations 114-124 are servicing (sending or receiving data) other groups of subscriber units 126-148. The clustering reduces the impact on system throughput, as all the subscriber units 126-148 are not absent from the system to sense other frequencies at the same time. The clustering is directed by base stations 114-124 to optimize system utilization. The sensing opportunities are provided by the zone controller 102, as it controls the operation of all the secondary devices 114-148 in the geographical region 100. Also, the zone controller 102 makes sure that all the secondary devices 114-148 on a particular channel frequency are silent when that channel frequency is being sensed.

In accordance with an embodiment, for in-band sensing all the secondary subscriber units utilizing same operating frequency are clustered in one group, so that they can be directed to sense the channel at the same time. The operating frequency refers to the frequency currently utilized by the secondary device 114-148.

Further, the secondary base stations 114-124 are clustered into various groups at a higher level, by the site controllers 108, 110, 112, based on the operating frequency utilized by each of the secondary base stations 114-124. For example, the secondary base stations 118-122 utilize the same operating frequency, e.g. f1, and are thus grouped together under a group, 1a. Similarly, various groups 1b, 1c (not shown) can be formed for the secondary base stations 114-124.

In accordance with the embodiment, the groups of secondary base stations 114-124 at the higher level are configured to receive sensing information from a plurality of secondary subscriber units 126-148 having groups 2a, 2b, etc. in the lower level. The sensing information includes information about at least one channel frequency that is occupied or unoccupied by a primary device. The occupied channel frequency is the channel frequency that is currently used by the primary device. Similarly, the unoccupied channel frequency is the channel frequency that is licensed to the primary device, but the channel frequency is temporarily unused by the primary device.

Additionally, the sensing information may include location and signal strength of the primary device. Further, the secondary base stations for example, 120 and 122 receive first sensing information from each of the secondary subscriber units 132-142 in the groups 2a, 2b, respectively. Furthermore, the secondary base stations 120, 122 combine the received first sensing information from each of the secondary subscriber units 132-142 in the corresponding groups 2a, 2b, to determine second sensing information. The second sensing information is determined based on the combination of the sensing information received from each of the secondary subscriber units 132-142 in the groups 2a, 2b at the lower level. Finally, the determined second sensing information is sent to the site controllers 110, 112.

In accordance with the embodiment, the sensing information is determined by each of the plurality of secondary devices 114-148 by using various sensing methods such as simple energy sensing methods, and decoding a primary signal method. The simple energy sensing method includes a radio frequency (RF) energy detection algorithm, a match filter algorithm, and a delay multiplier algorithm.

In accordance with some embodiments, the zone controller 102 receives the sensing information from the site controllers 108-112 which further receive the sensing information from each of the secondary base stations 114-124. Further, the secondary base stations 114-124 receive the sensing information from the secondary subscriber units 126-148, the secondary base stations 114-124 and the secondary subscriber units 126-148 being clustered into various groups at lower and higher levels. Based on the received sensing information from the site controllers 108-112, the zone controller 102 determines spectrum opportunity, in the spectrum. The spectrum opportunity may refer to a channel of a frequency in a particular band or a particular bandwidth of a frequency and identifies a frequency or a frequency bandwidth that is unoccupied by any of the primary devices in the spectrum of primary communication system 104. Further, the spectrum opportunity can also be referred as a frequency that may be used on non-interfering basis. Next, the zone controller 102 collects the sensing information from each of the site controllers 108-112. The zone controller 102 then combines and correlates the collected sensing information to determine one or more spectrum opportunities, and thus perform dynamic spectrum allocation. Specifically, the allocated spectrum opportunity is unoccupied by any of the primary devices in the primary communication system 104. Further, the zone controller 102 allocates the determined spectrum opportunity to at least one of the secondary device 114-148 that is non-adjacent to another secondary device utilizing the same operating frequency.

In accordance with the embodiment, the operating frequency utilized by the secondary device 114-148 is relinquished in case a primary device is detected on the corresponding frequency currently utilized by any of the secondary devices 114-148. In such a scenario, the zone controller 102 allocates another spectrum opportunity from the list of channel frequencies maintained by the zone controller 102, to the secondary device 114-148, that is not utilized by any of the primary devices in the primary communication system 104 and is non-adjacent to another secondary device utilizing the same operating frequency.

In another embodiment, the dynamic spectrum opportunity allocation may be performed by the zone controller 102 based on a frequency reuse scheme. The frequency reuse scheme is a scheme in which one secondary device 114-148 utilizing the spectrum opportunity does not interfere with other secondary devices 114-148 utilizing the same spectrum opportunity. In other words, the spectrum opportunity is allocated to at least one secondary device 114-148 that has predetermined frequency spacing from another secondary device 114-148 and the primary device utilizing the same spectrum opportunity. The predetermined frequency spacing may be defined as a minimum spacing required between at least two spectrum opportunities such that there is no interference between the secondary devices 114-148 operating at the corresponding spectrum opportunities. In addition, the zone controller 102 also makes sure that the spectrum opportunity utilized by the secondary devices 114-148 may not interfere with the primary communication system 104 operating on the same or adjacent frequencies. The dynamic spectrum opportunity allocation is continuously performed by the zone controller 102 based on sensing information received from the site controllers 108-112.

Further, at the reception of the sensing information, the zone controller 102 may identify any change in spectrum utilization by the primary communication system 104 in the geographic region 100. In another embodiment, the zone controller 102 may determine that the currently operational secondary communication system 106 is potentially interfering with the primary communication system 104 because of the change in spectrum utilization, power level, updated geo-location database information, contour maps etc. If there is any change in spectrum utilization by primary communication system 104 or if secondary communication system 106 is interfering with primary communication system 104 because of this change, then the zone controller 102 dynamically reassigns the spectrum opportunity to other various secondary devices 114-148.

Figure 2:
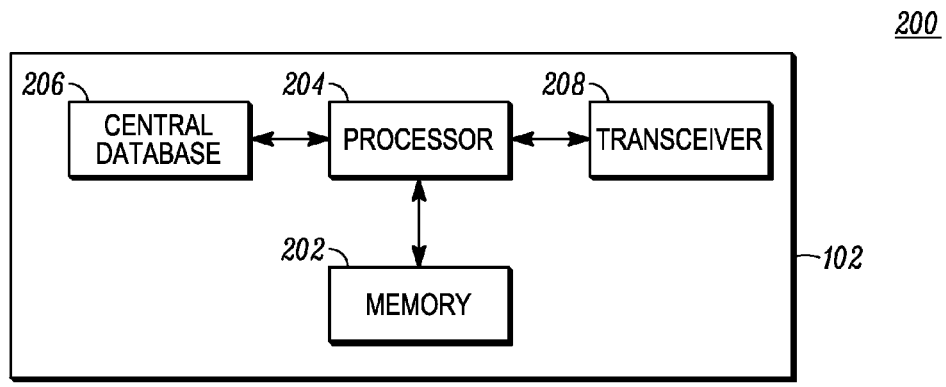
FIG. 2 depicts a block diagram of a zone controller in accordance with some embodiments.

FIG. 2 is a block diagram illustrating the internal components of the zone controller 102 in accordance with some embodiments of the invention. The exemplary components include a memory 202, a processor 204, a central database 206, and a transceiver 208.

In accordance with an embodiment, the memory 202 is coupled to the processor 204 to store the sensing information received from the various site controllers 108-112 that receive the sensing information from secondary devices 114-148. The secondary devices 114-148 include secondary subscriber units 126-148, and secondary base stations 114-124. The memory 202 accordingly updates the information stored in it.

In accordance with an embodiment, the central database 206 is coupled to the processor 204. The central database 206 includes information about all the channel frequencies in the spectrum, and their corresponding primary devices to which the channel frequencies are licensed. The central database 206 also includes information such as location of the primary devices, and time intervals at which the primary devices operate or utilize the channel frequency. In one embodiment, the central database 206 includes information about the operating frequencies utilized by each of the secondary devices 114-148, which are further utilized to prevent co-channel and adjacent channel interference while allocating the channel frequencies to the secondary devices 114-148.

In accordance with the embodiment, the transceiver 208 coupled to the processor 204 enables the zone controller 102 to receive the sensing information from the site controllers 108-112, and to transmit the spectrum opportunity to the secondary devices 114-148

Operationally, the zone controller 102 receives the sensing information from each of the site controllers 108-112 which further receive the sensing information from the plurality of secondary devices 114-148, via the transceiver 208. The memory 202 stores the sensing information that is received from the zone controller 102. Similarly, the central database 206 maintains a list of operating frequencies utilized by each of the secondary devices 114-148. Further, the processor 204 determines the spectrum opportunity based on the received sensing information that is stored in memory 202, and the processor 204 allocates the determined spectrum opportunity to each of the secondary devices 114-148 based on the information stored in the central database 206.

Figure 3:
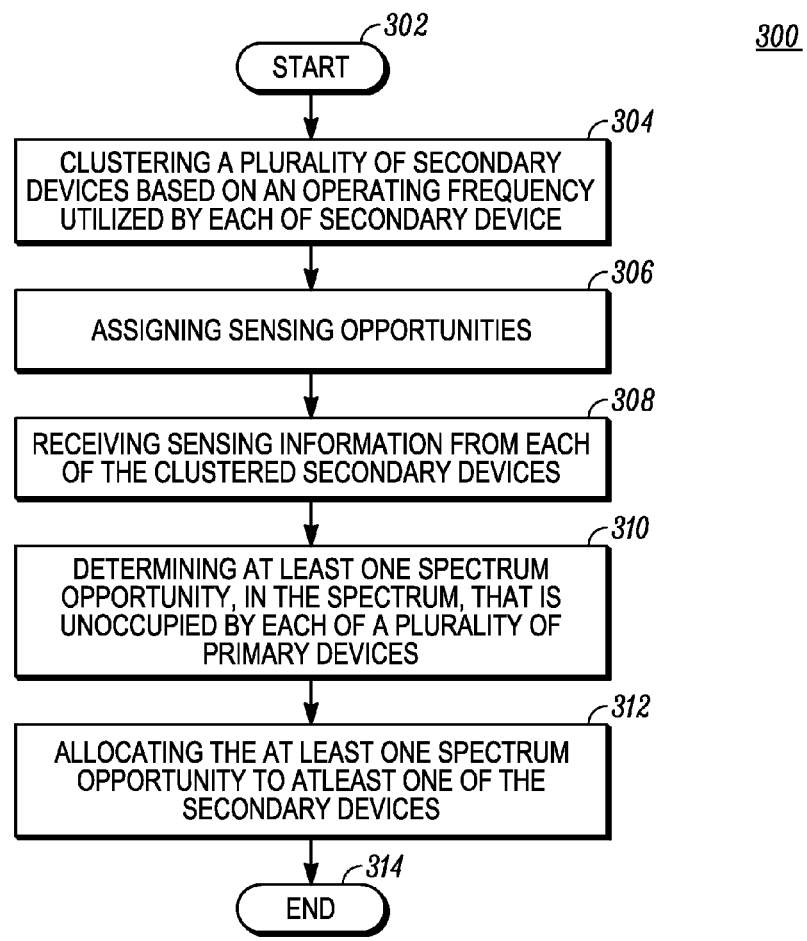
FIG. 3 is a flowchart of a method for dynamic spectrum allocation in accordance with some embodiments.

FIG. 3 is a flowchart of a method for dynamic spectrum allocation in accordance with some embodiments. The method is described from the perspective of the zone controller 102, shown in FIG. 2. Referring to FIG. 3, the method begins with a step of clustering 304 a plurality of secondary devices 114-148 based on an operating frequency utilized by each of the secondary devices 114-148. The clustering of the secondary devices 114-148 can be done by clustering the secondary devices 114-148 into various groups at different levels, for example, the secondary subscribers units 126-148 are grouped at a lower level to form groups like 2a, 2b, 3a, 3b. Similarly, the secondary base stations 114-124 are grouped at a higher level to form groups like 1a, and so on.

Upon clustering the secondary devices 114-148 into various groups at different levels, the method continues with a step of assigning 306 sensing opportunities to each of the clustered secondary devices 114-148. The sensing opportunities are provided by the zone controller 102, as the zone controller 102 controls the operation of all the secondary devices 114-148. The zone controller 102 assigns the sensing opportunities to the site controllers 108-112 which further assign to the secondary devices 114-148. Specifically, the sensing opportunity assignment includes groups at higher levels directing the groups at lower levels to sense particular frequencies for particular time interval by using particular sensing algorithms. The method 300 then moves to the step of receiving 308 sensing information from each of the clustered secondary devices 114-148. For example, the secondary base stations 120 and 122 receive first sensing information from the secondary subscriber units in groups 2a and 2b, respectively. Further, the secondary base stations 120 and 122, in the group 1a, determine second sensing information based on the received sensing information from the secondary subscriber units 132-142, and forward the second sensing information to the site controllers 110 and 112. Similarly, the sensing information is further forwarded from the site controllers 110 and 112 to the zone controller 102.

The method 300 then continues with a step of determining 310 at least one spectrum opportunity, in the spectrum that is currently unoccupied by each of a plurality of primary devices. On determining the spectrum opportunity, the method 300 continues to a step of dynamically allocating 312 the spectrum opportunity to at least one of the secondary devices 114-148, thereby performing dynamic spectrum allocation.

Further, the method continues to repeat from the steps of clustering 304 to allocating 312, whenever a primary user is detected on the frequency being currently utilized by the secondary devices 114-148. In another embodiment, if the zone controller 102 determines any change in spectrum utilization by the primary communication system 104, the zone controller 102 re-assigns the spectrum opportunities to various secondary devices 114-148 that may not interfere with the primary communication system 104.

Figure 4:
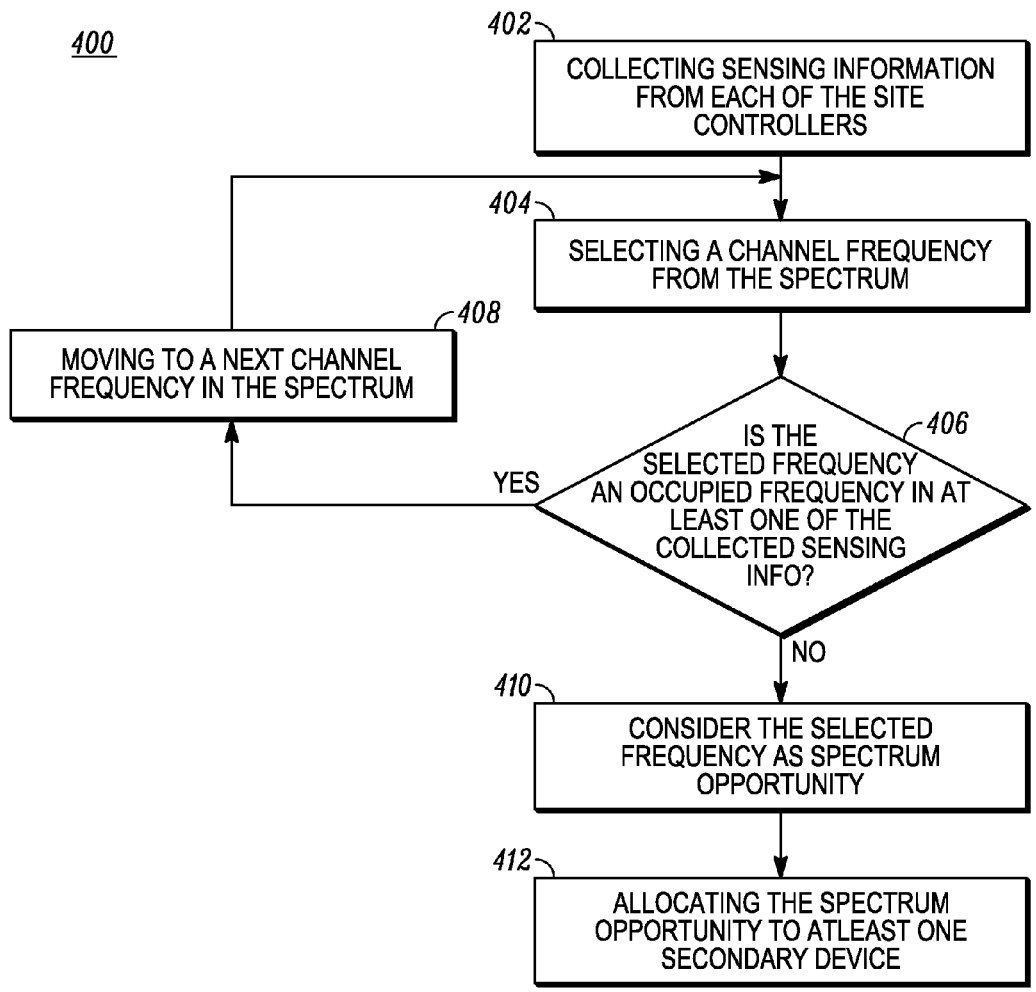
FIG. 4 is a detailed flowchart presenting a method for dynamic spectrum allocation in accordance with some embodiments.

FIG. 4 is a detailed flowchart of the method for dynamic spectrum allocation in accordance with some embodiments. FIG. 4 elaborates the steps of 308-312 of FIG. 3. FIG. 4 is described in reference to the internal components of the zone controller 102 shown in FIG. 2. Referring to FIG. 4, the method 400 starts with a step of collecting 402 the sensing information from each of the site controllers 108-112. The method 400 then continues with a step of selecting 404 a channel frequency, by a processor 204 of the zone controller 102, from the spectrum. The method 400 then continues with the step of determining 406 whether the selected channel frequency is an occupied channel frequency in the collected sensing information. If the selected channel frequency is an occupied channel frequency, the method 400 continues with a step of moving 408 to a next channel frequency in the spectrum, and further continuing with a step of selecting 404 the next channel frequency in the spectrum.

On the other hand, if the selected channel frequency is not an occupied channel frequency, the method 400 continues with a step of zone controller 102 considering 410 the selected frequency as a spectrum opportunity. The method then continues with the step of allocating 412 the spectrum opportunity to at least one secondary device 114-148 in the secondary communication system 106. Any changes in the spectrum of primary communication system 104 that cause interference in primary communication system 104 or the secondary communication system 106 leads to spectrum opportunity reassignment. Thus, the method 400 provides dynamic spectrum allocation for the secondary communication system 106.

Figure 5:
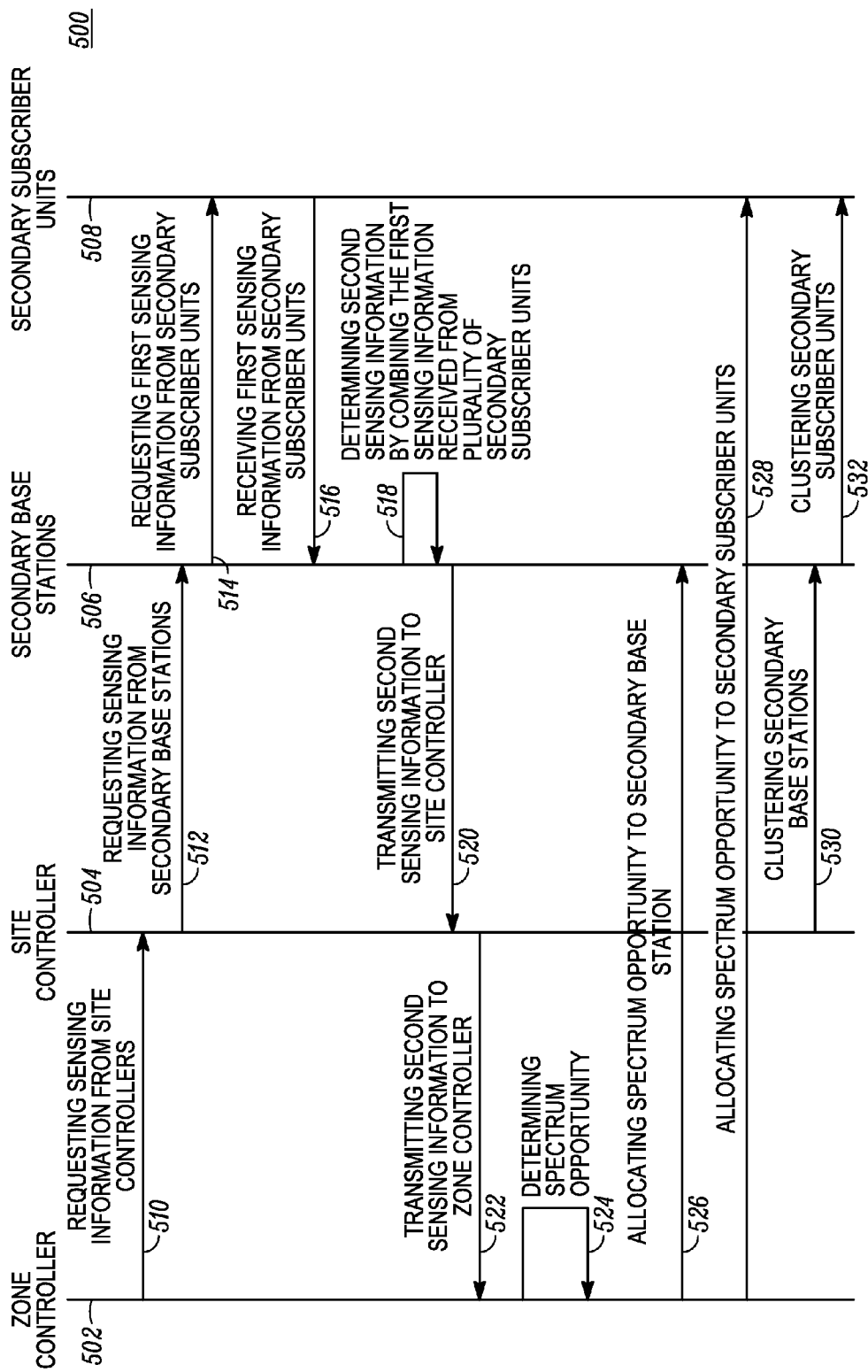
FIG. 5 is a signal flow diagram of dynamic spectrum allocation in a secondary communication system in accordance with some embodiments.

FIG. 5 is a signal flow diagram 500 of dynamic spectrum allocation in the secondary communication system 106 in accordance with some embodiments. The signal flow 500 begins with the step of requesting 510, by a zone controller 502, sensing information from the site controllers 504. Upon receiving the request for determining the sensing information, the signal flow 500 continues with a step of site controllers 504 requesting 512 sensing information from secondary base stations 506. The signal flow 500 then continues to a step of requesting 514, first sensing information from secondary subscriber units 508. The first sensing information includes in-band sensing and out-of-band sensing information of the frequency channels associated with the secondary subscriber units 508. In response to the step of requesting 514 the first sensing information from the secondary subscriber units 508, the secondary base stations 506 receive 516 the first sensing information from the secondary subscriber units 508. The signal flow 500 then continues to a step of determining 518 second sensing information. The second sensing information is determined 518 by combining the first sensing information received from the secondary subscriber units 508. The sensing information includes in-band sensing and out-of-band sensing of the frequency channels associated with the secondary subscriber units 508.

Further, the signal flow 500 continues with a step of secondary base stations 506 transmitting 520 the determined second sensing information to the site controllers 504. The received sensing information is then transmitted 522 to the zone controller 502 by the site controllers 504. Based on the received sensing information from the site controllers 504, the signal flow 500 moves to a step of determining 524 by zone controller 502 spectrum opportunity, that is unoccupied by any of the primary devices in the spectrum of primary communication system 104.

The signal flow 500 then continues with a step of zone controller 502 dynamically allocating 526 spectrum opportunities to the secondary base stations 506 via the site controllers 504. In one embodiment, the spectrum opportunities may be reassigned based on in-band incumbent detection. The signal flow 500 then moves to a step of allocating 528 the determined spectrum opportunity to at least one secondary subscriber unit 508 via the site controllers 504 and the secondary base stations 506.

Upon allocating the spectrum opportunity, the signal flow 500 continues with a step of site controller 504 clustering 530 the secondary base stations 506 based on the allocated spectrum opportunities, and then the step of secondary base stations 506 clustering 532 the secondary subscriber units 508.

Accordingly, there has been provided a means for optimizing spectrum allocation amongst secondary systems that are seeking to utilize the licensed spectrum of primary communication systems (such as incumbent systems).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A method for dynamic spectrum allocation to a secondary communication system seeking to operate within the spectrum of a regulated primary communication system, the method comprising:
   clustering a plurality of secondary devices based on an operating frequency utilized by each of the secondary devices;
   receiving sensing information from each of the clustered secondary devices, wherein the sensing information indicates at least one of an occupied channel frequency and an unoccupied channel frequency in the spectrum;
   determining at least one spectrum opportunity, in the spectrum, that is unoccupied by each of a plurality of primary devices based on the received sensing information; and
   allocating the at least one spectrum opportunity to at least one of the plurality of secondary devices.

2. The method of claim 1, further comprising assigning at least one sensing opportunity to the plurality of clustered secondary devices after a step of clustering the plurality of secondary devices.

3. The method of claim 1, wherein the plurality of secondary devices include at least one of a secondary base station and a secondary subscriber unit.

4. The method of claim 1, wherein the plurality of primary devices include at least one of a primary base station and a primary subscriber unit.

5. The method of claim 1, wherein clustering the plurality of secondary devices comprises grouping the secondary devices into a plurality of groups based on the operating frequency utilized by each of the secondary devices, the operating frequency being currently unoccupied by each of the primary devices.

6. The method of claim 5, wherein each group includes the secondary devices operating at same frequency.

7. The method of claim 1, wherein receiving sensing information comprises receiving the sensing information from each of the clustered secondary devices via a corresponding site controller.

8. The method of claim 1, wherein the received sensing information is determined by each secondary device utilizing at least one of a radio frequency (RF) energy detection algorithm, a match filter algorithm, and a delay multiplier algorithm.

9. The method of claim 1, wherein the sensing information includes at least one of in-band sensing information and out-of-band sensing information.

10. The method of claim 9, wherein the in-band sensing information includes the sensing information of the operating frequency utilized by a corresponding secondary device.

11. The method of claim 9, wherein the out-of-band sensing information includes the sensing information of at least one channel frequency other than the operating frequency utilized by a corresponding secondary device.

12. The method of claim 9, wherein the in-band sensing information is determined by each secondary device during a quiet period.

13. The method of claim 1, wherein the sensing information includes at least one of a location and signal strength of at least one primary device.

14. The method of claim 1, wherein determining the at least one spectrum opportunity comprises:
collecting the sensing information from each of the clustered secondary devices via a corresponding site controller; and
computing the collected sensing information to determine the at least one spectrum opportunity when the at least one spectrum opportunity is unoccupied by each of the plurality of primary devices.

15. The method of claim 1, wherein the operating frequency utilized by each of the secondary devices is relinquished in response to detection of at least one of the primary devices on the operating frequency currently occupied by each of the secondary devices.

16. The method of claim 1, wherein the spectrum opportunity is allocated to the at least one of the secondary devices that is non-adjacent to another secondary device utilizing the same spectrum opportunity.

17. The method of claim 16, wherein the spectrum opportunity is allocated to the at least one of the secondary devices having a predetermined frequency spacing from at least one of the secondary devices and at least one of the primary devices utilizing the same spectrum opportunity.

18. The method of claim 1, wherein the spectrum includes at least one of a television white space band and radio band.

19. An apparatus for dynamic allocation of spectrum in a secondary communication system, the apparatus comprising:
a processor for clustering a plurality of secondary devices based on an operating frequency utilized by each of the secondary devices;
a transceiver, coupled to the processor, for receiving sensing information from each of the clustered secondary devices, wherein the sensing information indicates at least one of an occupied channel frequency and an unoccupied channel frequency in the spectrum; and
the processor for determining at least one spectrum opportunity, in the spectrum, that is unoccupied by each of a plurality of primary devices based on the received sensing information, and allocating the at least one spectrum opportunity to at least one of the plurality of secondary devices.

20. The apparatus of claim 19, wherein the processor assigns at least one sensing opportunity to the plurality of clustered secondary devices after clustering the plurality of secondary devices.

21. The apparatus of claim 19, wherein the processor groups the plurality of secondary devices by clustering the secondary devices into a plurality of groups, further wherein each group includes the secondary devices utilizing the same operating frequency.

22. The apparatus of claim 19, wherein the sensing information includes at least one of in-band sensing information and out-of-band sensing information.

23. The apparatus of claim 19, wherein processor determines the at least one spectrum opportunity by collecting the sensing information from each of the clustered secondary devices via a corresponding site controller, and computing the collected sensing information to determine the at least one spectrum opportunity when the least one spectrum opportunity is unoccupied by each of the plurality of primary devices.

* * * * *